United States Patent
Nakamura (10) Patent No.: US 11,525,751 B2
(45) Date of Patent: Dec. 13, 2022

(54) SENSOR DRIVE CIRCUIT WITH IMPROVED TEMPERATURE CHARACTERISTIC COMPENSATION

(71) Applicant: Hajime Nakamura, Tokyo (JP)

(72) Inventor: Hajime Nakamura, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/303,282

(22) Filed: May 26, 2021

(65) Prior Publication Data

US 2021/0381917 A1    Dec. 9, 2021

(30) Foreign Application Priority Data

Jun. 3, 2020  (JP) .............................. JP2020-096948

(51) Int. Cl.
| | | |
|---|---|---|
| G01L 9/06 | (2006.01) | |
| G01L 19/00 | (2006.01) | |
| G01L 19/04 | (2006.01) | |
| G01D 3/028 | (2006.01) | |

(52) U.S. Cl.
CPC .............. G01L 9/065 (2013.01); G01D 3/028 (2013.01); G01L 19/0092 (2013.01); G01L 19/04 (2013.01)

(58) Field of Classification Search
None
See application file for complete search history.

(56) References Cited

U.S. PATENT DOCUMENTS

| | | | | | |
|---|---|---|---|---|---|
| 5,550,469 | A | * | 8/1996 | Tanabe | G01R 33/06 324/225 |
| 6,154,087 | A | * | 11/2000 | Ito | G01D 3/0365 327/512 |
| 6,300,818 | B1 | * | 10/2001 | Mao | H02M 3/156 323/907 |
| 7,366,048 | B2 | * | 4/2008 | Byeon | G11C 11/4078 365/189.11 |

(Continued)

FOREIGN PATENT DOCUMENTS

| | | |
|---|---|---|
| JP | H09-101211 | 4/1997 |
| JP | H11-108786 | 4/1999 |

(Continued)

*Primary Examiner* — Brandi N Hopkins
*Assistant Examiner* — Nigel H Plumb
(74) *Attorney, Agent, or Firm* — IPUSA, PLLC (57) ABSTRACT

A sensor drive circuit for driving a sensor with a current includes at least one circuit configured to generate a drive current for the sensor, the drive current having a reverse temperature characteristic with respect to a temperature characteristic of an output voltage of the sensor. A temperature characteristic of sensor sensitivity has a negative first order coefficient and a positive second order coefficient. The sensor drive circuit includes a first current source configured to generate a first current having a temperature characteristic of which a first order coefficient is positive. The sensor drive circuit includes a second current source configured to generate a second current having a temperature characteristic of which a first order coefficient is negative. The sensor drive circuit includes a first current calculator configured to add the first current and the second current to generate a third current.

7 Claims, 5 Drawing Sheets

(56) References Cited

U.S. PATENT DOCUMENTS

| | | | |
|---|---|---|---|
| 7,733,132 B2* | 6/2010 | Byeon | G11C 5/147 |
| | | | 327/78 |
| 2007/0002640 A1* | 1/2007 | Byeon | G11C 11/4078 |
| | | | 365/189.11 |
| 2008/0212390 A1* | 9/2008 | Byeon | G11C 11/4074 |
| | | | 365/189.11 |

FOREIGN PATENT DOCUMENTS

| | | |
|---|---|---|
| JP | 2001-091296 | 4/2001 |
| JP | 2001-091387 | 4/2001 |

\* cited by examiner

FIG.5

SENSOR DRIVE CIRCUIT WITH IMPROVED TEMPERATURE CHARACTERISTIC COMPENSATION

CROSS-REFERENCE TO RELATED APPLICATION

This application claims priority under 35 U.S.C. § 119 to Japanese Patent Application No. 2020-096948, filed Jun. 3, 2020, the contents of which are incorporated herein by reference in their entirety.

BACKGROUND

1. Field of the Invention

The present disclosure relates to a sensor drive circuit.

2. Description of the Related Art

Techniques have been proposed to adjust temperature characteristics of drive voltages or drive currents for the sensors, in order to improve temperature characteristics of span voltages for sensors.

For example, in the technique disclosed in Patent documents 1 and 2, when the drive current is generated, a first order component of a temperature characteristic of a sensor can be compensated by division of a power supply voltage through temperature-sensitive resistance (a thermistor, or a set of resistors having different temperature coefficients).

In the technique disclosed in Patent document 3, temperature-sensitive resistance for a gain is used when a drive voltage for a sensor is generated based on a band gap reference (BGR) voltage, and thus a second order component of a temperature characteristic of the sensor can be also compensated.

In the technique disclosed in Patent document 4, a current is increased or decreased in accordance with the output of a temperature sensor, and thus a temperature characteristic of the temperature sensor can be compensated.

CITATION LIST

Patent Document

Patent document 1: Japanese Unexamined Patent Application Publication No. 2001-091296
Patent document 2: Japanese Unexamined Patent Application Publication No. H9-101211
Patent document 3: Japanese Unexamined Patent Application Publication No. 2001-091387
Patent document 4: Japanese Unexamined Patent Application Publication No. H11-108786

SUMMARY

According to one embodiment, a sensor drive circuit for driving a sensor with a current is provided, the sensor having a temperature characteristic with respect to sensitivity, and the temperature characteristic having a negative first order coefficient and a positive second order coefficient. The sensor drive circuit includes a first current source configured to generate a first current having a temperature characteristic of which a first order coefficient is positive and of which a second order coefficient is negative. The sensor drive circuit includes a second current source configured to generate a second current having a temperature characteristic of which a first order coefficient is negative and of which a second order coefficient is negative. The sensor drive circuit includes a current amplifier configured to amplify a third current, the third current being set by adding the first current and the second current. The sensor drive circuit includes a constant current source configured to generate a temperature-corrected constant current, such that a drive current for the sensor is set by adding the constant current to the amplified third current.

DESCRIPTION OF THE EMBODIMENTS

Related art information relevant to the present disclosure recognized by the inventor of this application will be provided below. In the techniques described in Patent documents 1 to 4 above, a second order component of the temperature characteristic of the span voltage for the sensor cannot be compensated with a relatively simple circuit configuration. Thus, with the relatively simple circuit configuration, an output error of the sensor due to a given temperature could not be corrected with high accuracy.

When such an output error of the sensor is corrected, an approach to digitally correct the output error is considered. In the approach to digitally correct the output error, temperature data is acquired and then a correction amount (function) corresponding to a given temperature is preliminarily stored in a storage area such as a non-volatile memory (NVM). Subsequently, a given output error of the sensor is digitized by analog-to-digital (A-D) conversion, and the digitized output error is corrected by a calculator. For example, when a single A-D converter is shared by a temperature sensor for acquiring a temperature and a correction sensor, the output of the temperature sensor and the output of the correction sensor are switched by a multiplexer, in order to acquire a target sensor output. Then, A-D conversion is performed with respect to a given sensor output. In this case, extra time is required for a switching operation to acquire a target sensor output, and in general, a length of the extra time is several ms, in comparison to a case where the switching operation is not performed. If multiple A-D converters are used, the extra time could be eliminated. However, the use of the multiple A-D converters might result in an increased chip area, and consequently a unit price of a given sensor drive circuit might be increased.

In a sensor drive circuit according to one or more embodiments below, with a relatively simple circuit configuration, an output error of a sensor due to a given temperature can be corrected with high accuracy. Also, in the sensor drive circuit according to the one or more embodiments, an output error of the sensor due to a temperature is corrected when an analog-digital (A-D) converter receives the output of the sensor, and thus switching by the A-D converter is not performed in order to acquire a temperature. Accordingly, a time is not required for acquiring the temperature.

One or more embodiments will be described below with reference to the drawings.

First Embodiment

Figure 1:
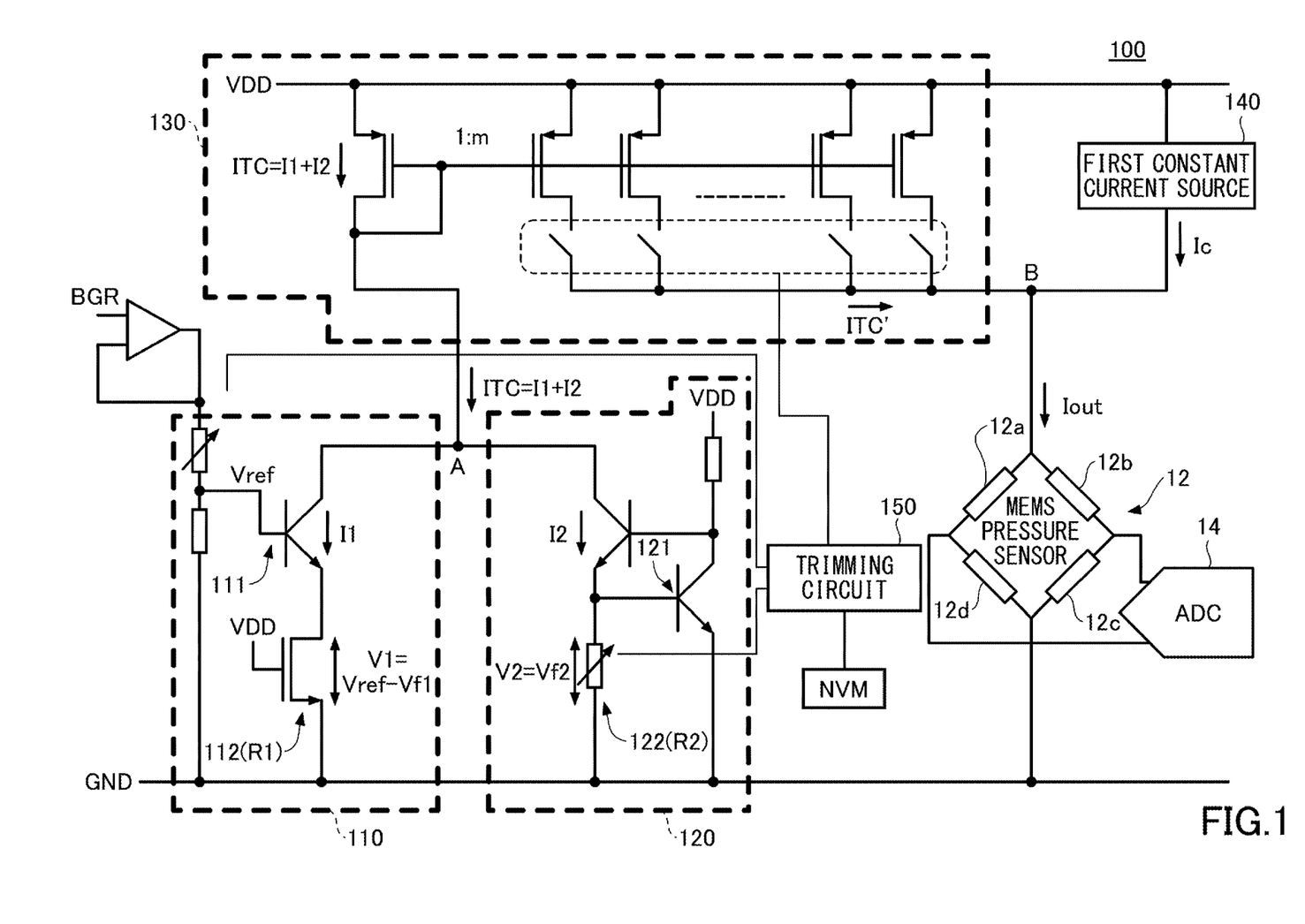
FIG. 1 is a diagram illustrating an example of the circuit configuration of a sensor drive circuit according to a first embodiment.

FIG. 1 is a diagram illustrating an example of the circuit configuration of a sensor drive circuit 100 according to a first embodiment. The sensor drive circuit 100 illustrated in FIG. 1 can drive a microelectromechanical systems (MEMS) pressure sensor 12. In this case, in the sensor drive circuit 100, a drive current Iout for the MEMS pressure sensor 12 is adjusted to have a reverse temperature characteristic (including a second order component) with respect to a temperature characteristic of a span voltage for the MEMS pressure sensor 12, and thus a second order component of the temperature characteristic of the span voltage for the MEMS pressure sensor 12 can be canceled. Accordingly, the sensor drive circuit 100 can correct an output error of the MEMS pressure sensor 12 due to a temperature, with high accuracy. In the example illustrated in FIG. 1, a detected signal (analog signal) by the MEMS pressure sensor 12 is output to an analog-to-digital (A-D) converter 14 and then is converted into a digital signal by the A-D converter 14.

Note that as illustrated in FIG. 1, in the MEMS pressure sensor 12, four piezoresistive elements 12a to 12d constitute a bridge circuit. The sensor drive circuit 100 according to the present embodiment is not limited to being used for driving the MEMS pressure sensor 12, and can be also used for driving another sensor (for example, a force tactile sensor, a semiconductor strain gauge, an acceleration sensor, a gyroscope, or the like).

As illustrated in FIG. 1, the sensor drive circuit 100 includes a first current source 110, a second current source 120, a connection node A, a current amplifier 130, a first constant current source 140, a connection node B, and a trimming circuit 150.

The first current source 110 generates a first current I1 having a temperature characteristic of which a first order coefficient is positive and of which a second order coefficient is negative. Specifically, the first current source 110 generates the first current I1, given by I1=V1/R1. Each of a voltage V1 and resistance R1 has a positive temperature characteristic. In the example illustrated in FIG. 1, the first current source 110 includes a bipolar transistor 111 and an n-type metal-oxide-semiconductor field effect transistor (NMOSFET) 112 (which is an example of "first resistance"). In the example illustrated in FIG. 1, in the first current source 110, a voltage (Vref−Vf1) is obtained by subtracting a threshold voltage Vf1 for a bipolar transistor 111, from a constant voltage (in this example, a constant voltage having a flat temperature characteristic) Vref, and is used as the voltage V1. The constant voltage Vref is set based on a band gap reference voltage (proportional to absolute temperature (PTAT) voltage). In the first current source 110, the NMOSFET 112 in an on state is used as the resistance R1. In the example illustrated in FIG. 1, by applying the voltage (Vref−Vf1) to a drain of the NMOSFET 112, the first current source 110 generates the first current I1.

The second current source 120 generates a second current I2 having a temperature characteristic of which a first order coefficient is negative and of which a second order coefficient is negative. Specifically, the second current source 120 generates the second current I2, given by I2=V2/R2. Each of a voltage V2 and resistance R2 has a negative temperature characteristic. In the example illustrated in FIG. 1, the second current source 120 includes a bipolar transistor 121 and a polysilicon resistor 122 (which is an example of "second resistance"). In the example illustrated in FIG. 1, in the second current source 120, a threshold voltage Vf2 for the bipolar transistor 121 is used as the voltage V2. In the second current source 120, the polysilicon resistor 122 is used as the resistance R2. In the example illustrated in FIG. 1, by applying the threshold voltage Vf2 across the polysilicon resistor 122, the second current source 120 generates the second current I2.

The connection node A is an example of a "first current calculated point." The first current source 110 and the second current source 120 are coupled together at the connection node A. In such a manner, a third current ITC flowing toward the connection node A is set by adding the first current I1, which is generated by the first current source 110, and the second current I2 generated by the second current source 120.

For the third current ITC flowing toward the connection node A, a first order coefficient of the temperature characteristic is the sum of a first order coefficient (positive) of the temperature characteristic of the first current I1 and a first order coefficient (negative) of the temperature characteristic of the second current I2. Thus, the temperature characteristic of the third current ITC has a relatively small first order coefficient (which is 0 or around 0). Note that the first order coefficient for the third current ITC can be set to be 0 or around 0, by adjusting a contribution of the temperature characteristic of each of the first current I1 and the second current I2. For example, in an environment in which room temperature is between 20° C. and 30° C., preferably between 22° C. and 28° C., and more preferably between 23° C. and 27° C., magnitudes of the first current I1 and second current I2 are set by the following condition. For example, a ratio given by I1/I2 is between 0.7 and 1.3, preferably between 0.8 and 1.2, and more preferably between 0.9 and 1.1.

For the third current ITC flowing toward the connection node A, a second order temperature characteristic of the temperature characteristic is the sum of a second order coefficient (negative) of the temperature characteristic of the first current I1 and a second order coefficient (negative) of the temperature characteristic of the second current I2. Thus, the temperature characteristic of the third current ITC has a relatively large second order coefficient.

Note that the resistance R2 or the like of the polysilicon resistor 122 is preferably adjusted in advance such that a ratio between the first order coefficient and the second order coefficient of the temperature characteristic of the third current ITC is the same as or approximates a ratio between a first order coefficient and a second order coefficient of a reverse temperature characteristic with respect to the temperature characteristic of a given span voltage.

The current amplifier 130 amplifies the third current ITC flowing toward the connection node A, by a gain of m to therefore generate an amplified current ITC'. In the example illustrated in FIG. 1, the current amplifier 130 is configured with a current mirror circuit. The current amplifier 130 preferably amplifies the third current ITC by a gain of m, such that a magnitude of the second order coefficient of the temperature characteristic of the amplified current ITC' is the same as or approximates a magnitude of a second coefficient of a reverse temperature characteristic with respect to the temperature characteristic of a given span voltage for the MEMS pressure sensor 12.

The first constant current source 140 generates a temperature-corrected first constant current Ic (in this example, a constant current having a flat temperature characteristic). Note that preferably, the first constant current Ic is appropriately adjusted in accordance with a resistance value for the MEMS pressure sensor 12, a supplied power supply voltage VDD, or the like, in order for the drive current Iout to be set to a predetermined value (for example, 300 uA) at a predetermined reference temperature (for example, 25° C.).

The connection node B is an example of a "second current calculated point." The current amplifier 130 and the first constant current source 140 are coupled together at the connection node B. In such a manner, a drive current Iout for driving the MEMS pressure sensor 12 is set by adding the first constant current Ic, which is generated by the first constant current source 140, to the current ITC' generated by the current amplifier 130.

The trimming circuit 150 can perform trimming (adjustment) with respect to each characteristic related with the sensor drive circuit 100. For example, the trimming circuit 150 can trim the resistance R2 of the polysilicon resistor 122 provided in the second current source 120, a resistance value of a potentiometer for determining the constant voltage Vref used in the first current source 110, a gain of m for the current amplifier 130, or the like. Note that the trimming circuit 150 is assumed to be implemented by digital trimming, but laser trimming may be adopted.

In such a configuration, the sensor drive circuit 100 according to the present embodiment generates the drive current Iout having a reverse temperature characteristic (including a second order component) with respect to the temperature characteristic of a given span voltage for the MEMS pressure sensor 12. Thus, the sensor drive circuit 100 can drive the MEMS pressure sensor 12 with the generated drive current Iout. Accordingly, in the sensor drive circuit 100 according to the present embodiment, a given second order component of the temperature characteristic of the span voltage for the MEMS pressure sensor 12 can be canceled in analog signal processing. As a result, the output voltage Vout of the MEMS pressure sensor 12 is set by the formula of Vout ≒ ½×$\pi_{44}$×σ×R×Iout. Where, $\pi44$ represents a piezoresistive coefficient, and represents stress applied to a given sensor element. In this case, a product calculated by $\pi44$×R indicates a temperature characteristic opposite to that of the drive current Iout, and thus the temperature characteristic of the output voltage Vout becomes flat. Accordingly, in the sensor drive circuit 100 according to the present embodiment, with a relatively simple circuit configuration, output errors of the MEMS pressure sensor 12 can be corrected with high accuracy.

(Test)

Figure 2:
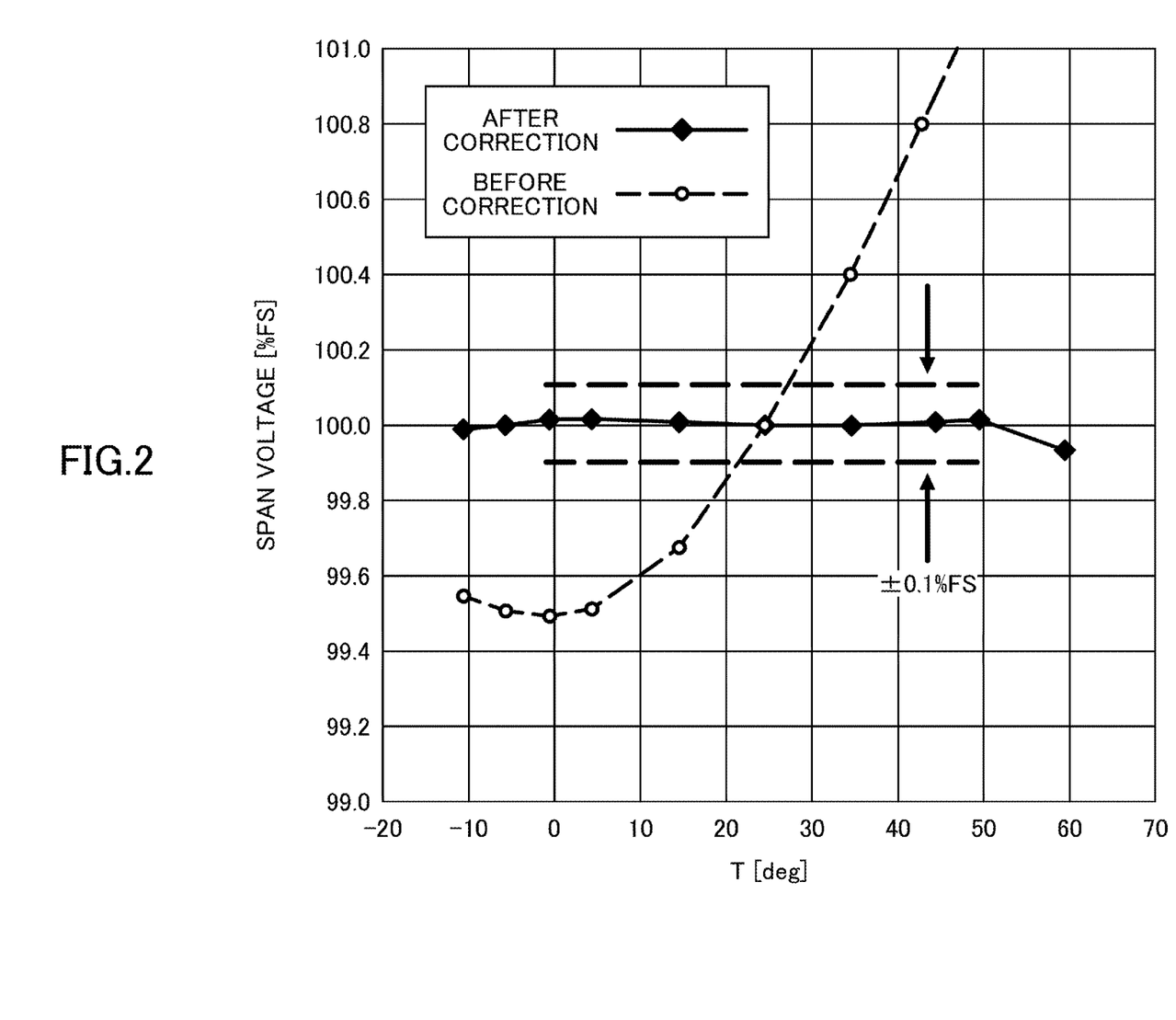
FIG. 2 is a diagram illustrating an example of a corrected result of a temperature characteristic of a span voltage for an MEMS pressure sensor, by the sensor drive circuit according to the first embodiment.

Hereafter, a test for the sensor drive circuit 100 according to the first embodiment will be described with reference to FIG. 2. FIG. 2 is a diagram illustrating an example of the corrected result of the temperature characteristic of the span voltage for the MEMS pressure sensor 12, by the sensor drive circuit 100 according to the first embodiment.

In the test, each span voltage for the MEMS pressure sensor 12 was measured as actual measured data under a condition in which pressure of a given MEMS pressure sensor was 4 kPa and the current applied to the given MEMS pressure sensor 12 was 300 uA. Then, a temperature characteristic based on the measured actual data, as well as a reverse temperature characteristic with respect to the temperature characteristic based on the measured data, were derived. Further, in the test, a simulation to drive the MEMS pressure sensor 12 was performed, where a drive current having the derived reverse temperature characteristic was used as a given drive current Iout generated by the sensor drive circuit 100, as described in the first embodiment.

Note that the test was performed under the condition below.
  power supply voltage: 3.3 V
  constant voltage as voltage V1 used in the first current source 110: 1.1 V
  size of NMOSFET 112 in first current source 110: W=2 um, L=35 um
  resistance value R2 of polysilicon resistor 122: 86 kΩ
  The first constant current Ic output from the first constant current source 140 was adjusted such that the drive current Iout was "300 uA" at a reference temperature of "25° C."

In FIG. 2, the temperature characteristic of a given span voltage before correction is represented by a dashed line, and the temperature characteristic of a given span voltage after correction is represented by a solid line. Note that in FIG. 2, a given span voltage at the reference temperature of "25° C." is plotted in association with 100%.

From FIG. 2, it has been confirmed that, for the temperature characteristic of the span voltage before correction, a range of variations in the span voltage was relatively large at a temperature ranging from 0° C. to 50° C. In contrast, it has been confirmed that, for the temperature characteristic of the span voltage after correction, a range of variations in the span voltage could be relatively small at a temperature ranging from 0° C. to 50° C.

Specifically, for the temperature characteristic of the span voltage before correction, the range of variations in the span voltage was 1.6%. In contrast, for the temperature characteristic of the span voltage after correction, the range of variations in the span voltage was within the target range of ±0.1%. Specifically, the range of variations in the span voltage was 0.02%, which was extremely small.

Second Embodiment

Figure 3:
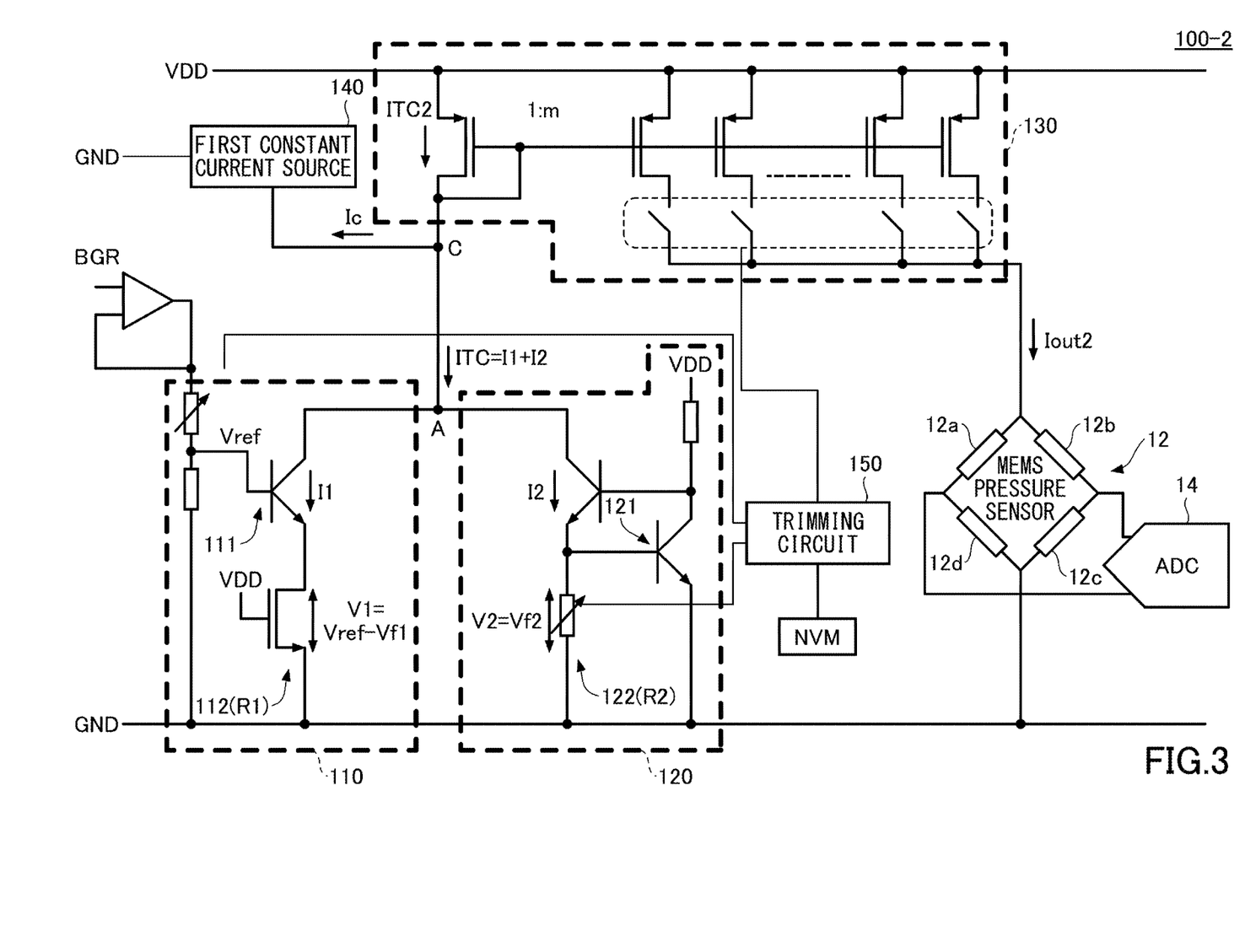
FIG. 3 is a diagram illustrating an example of the circuit configuration of the sensor drive circuit according to a second embodiment.

Hereafter, a second embodiment will be described with reference to FIG. 3. FIG. 3 is a diagram illustrating an example of the circuit configuration of a sensor drive circuit 100-2 according to the second embodiment. In the following description, the portion of the sensor drive circuit 100-2 that differs from the sensor drive circuit 100 according to the first embodiment will be described.

In the sensor drive circuit 100-2 illustrated in FIG. 3, the connection node B is not provided. Instead of the connection node B, in the sensor drive circuit 100-2, a connection node C is provided between the connection node A and the current amplifier 130, and a first constant current source 140 is coupled to the connection node C. In other words, in the sensor drive circuit 100-2, as illustrated in FIG. 3, the first constant current source 140 is provided at a rear stage of the current amplifier 130. In contrast, in the sensor drive circuit 100 as illustrated in FIG. 1, the first constant current source 140 is provided at a front stage of the current amplifier 130. In this regard, the sensor drive circuit 100-2 differs from the sensor drive circuit 100.

The connection node C is an example of a "second current calculated point." The connection node A and the first constant current source 140 are coupled together at the connection node C. In such a case, a fourth current ITC2 flowing toward the connection node C is set by adding the first constant current Ic, which is generated by the first current contact source 140, to the third current ITC flowing toward the connection node A.

In the sensor drive circuit 100-2 illustrated in FIG. 3, the current amplifier 130 amplifies the fourth current ITC2 flowing toward the connection node C, by a gain of m to thereby generate a drive current Iout2 for driving the MEMS pressure sensor 12. In this description, the current amplifier 130 preferably amplifies the fourth current ITC2 by a gain of m, such that a magnitude of a second order coefficient of the temperature characteristic of the drive current Iout2 is the same as or approximates a magnitude of a second coefficient of a reverse temperature characteristic with respect to the temperature characteristic of a given span voltage for the MEMS pressure sensor 12.

In such a configuration, in the sensor drive circuit 100-2 according to the present embodiment, the third current ITC can be adjusted (subtraction of the first constant current Ic), by using the first constant current Ic generated by the first constant current source 140. Thus, the fourth current ITC2 can be set. In such a case, in the sensor drive circuit 100-2 according to the present embodiment, the current amplifier 130 amplifies the fourth current ITC2 by a gain of m to thereby generate the drive current Iout2 having a reverse temperature characteristic (including a second order characteristic) with respect to the temperature characteristic of the span voltage for the MEMS pressure sensor 12. Thus, the sensor drive circuit 100-2 can drive the MEMS pressure sensor 12 with the drive current Iout2. Accordingly, the sensor drive circuit 100-2 according to the present embodiment can cancel a given second order component of the temperature characteristic of the span voltage for the MEMS pressure sensor 12, in analog signal processing. As a result, the output voltage Vout of the MEMS pressure sensor 12 is set by the formula of Vout $\fallingdotseq$ $\frac{1}{2} \times \pi 44 \times \sigma \times R \times$Iout. In this case, the product calculated by $\pi 44 \times R$ indicates a temperature characteristic opposite to that of the drive current Iout, and thus the temperature characteristic of the output voltage Vout becomes flat. Accordingly, in the sensor drive circuit 100-2 according to the present embodiment, with a relatively simple circuit configuration, output errors of the MEMS pressure sensor 12 due to a given temperature can be corrected with high accuracy.

Third Embodiment

Figure 4:
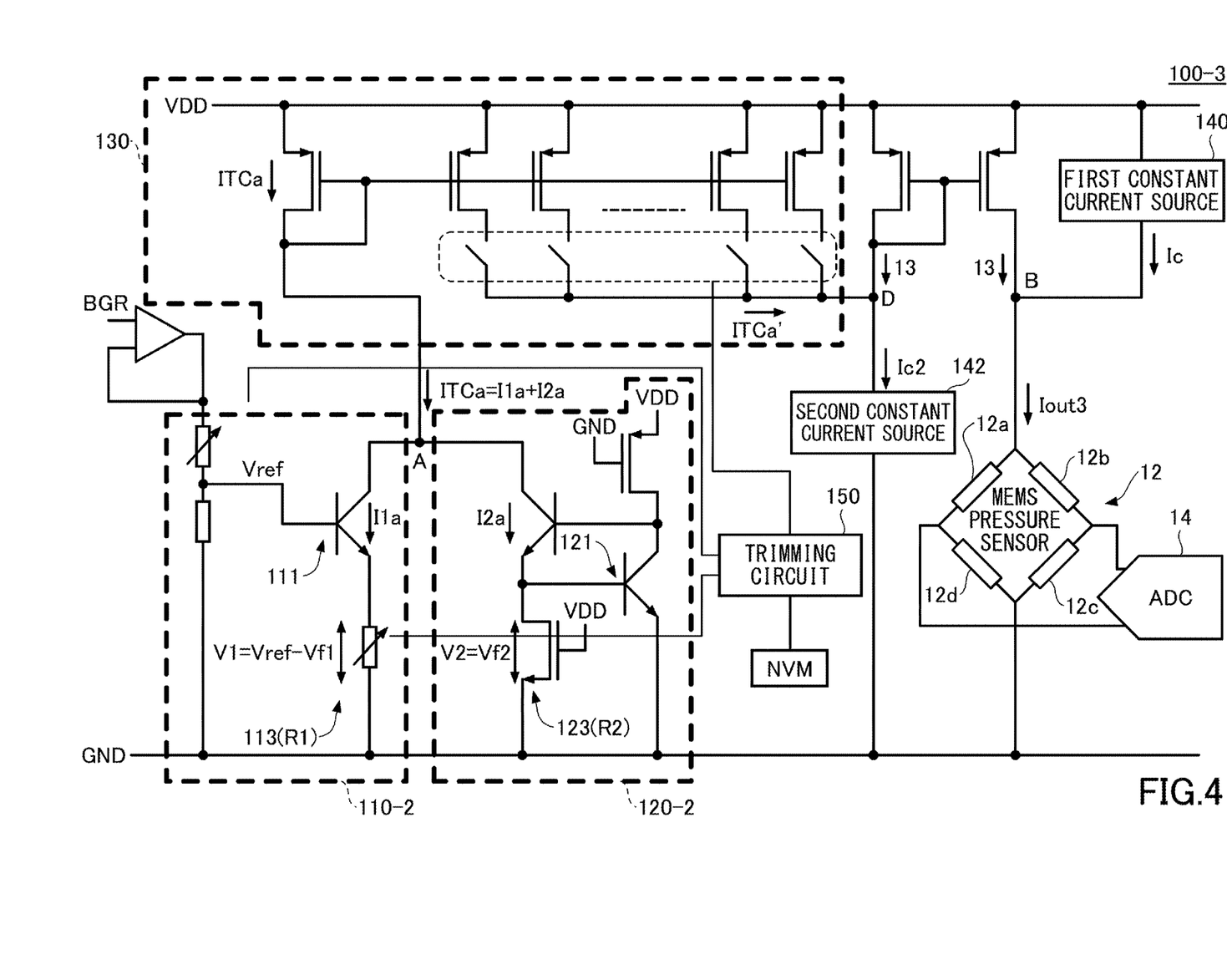
FIG. 4 is a diagram illustrating an example of the circuit configuration of the sensor drive circuit according to a third embodiment.

Hereafter, a third embodiment will be described with reference to FIG. 4. FIG. 4 is a diagram illustrating an example of the circuit configuration of a sensor drive circuit 100-3 according to the third embodiment. In the following description, the portion of the sensor drive circuit 100-3 that differs from the sensor drive circuit 100 according to the first embodiment will be described.

The sensor drive circuit 100-3 illustrated in FIG. 4 includes a first current source 110-2 and a second current source 120-2, instead of the first current source 110 and the second current source 120. The first current source 110-2 includes a polysilicon resistor 113, instead of the NMOSFET 112. The second current source 120-2 includes an NMOSFET 123, instead of the polysilicon resistor 122. In other words, the sensor drive circuit 100-3 illustrated in FIG. 4 differs from the sensor drive circuit 100 illustrated in FIG. 1, in that the first current source 110-2 includes the polysilicon resistor 113 and the second current source 120-2 includes the NMOSFET 123.

In such a manner, in the sensor drive circuit 100-3, by applying the above-mentioned voltage (Vref−Vf1) across the polysilicon resistor 113, the first current source 110-2 generates a first current I1a having a temperature characteristic of which a first order coefficient is positive and of which a second order coefficient is positive.

Also, in the sensor drive circuit 100-3, by applying the above-mentioned threshold voltage Vf2 to a drain of the NMOSFET 123, the second current source 120-2 generates a second current I2a having a temperature characteristic of which a first order coefficient is negative and of which a second order coefficient is positive.

In the sensor drive circuit 100-3, a third current ITCa is set by adding the first current I1a, which is generated by the first current source 110-2, and the second current I2a generated by the second current source 120-2.

In the sensor drive circuit 100-3, for the third current ITCa flowing toward the connection node A, a first order coefficient of the temperature characteristic is the sum of a first order coefficient (positive) of the temperature characteristic of the first current I1a and a first order coefficient (negative) of the temperature characteristic of the second current I2a. Thus, the first order coefficient for the third current ITCa becomes relatively small (0 or around 0).

In contrast, for the third current ITCa flowing toward the connection node A, a second order temperature characteristic of the temperature characteristic is the sum of a second order coefficient (positive) of the temperature characteristic of the first current I1a and a second order coefficient (positive) of the temperature characteristic of the second current I2a. Thus, the second order coefficient for the third current ITCa becomes relatively large.

Further, in the sensor drive circuit 100-3, the current amplifier 130 amplifies the third current ITCa flowing toward the connection node A, by a gain of m to thereby generate an amplified current ITCa'.

The sensor drive circuit 100-3 illustrated in FIG. 4 also includes a second constant current source 142 and a connection node D. The second constant current source 142 generates a temperature-corrected second constant current Ic2 (in this example, a constant current having a flat temperature characteristic). The current amplifier 130 and the second constant current source 142 are coupled together at the connection node D. In such a manner, a current I3 flowing toward the connection node D is set through subtraction of the current ITCa', which is generated by the current amplifier 130, from the second constant current Ic2 generated by the second constant current source 142, where the temperature characteristic of the set current I4 has a negative second order coefficient.

In the sensor drive circuit 100-3, a drive current Iout3 for driving the MEMS pressure sensor 12 is set by adding the first constant current Ic, which is generated by the first constant current source 140, to the current I3 flowing toward the connection node B.

In such a configuration, the sensor drive circuit 100-3 according to the present embodiment generates the drive current Iout3 having a reverse temperature characteristic (including a second order characteristic) with respect to the temperature characteristic of a given span voltage for the MEMS pressure sensor 12. Thus, the sensor drive circuit 100-3 can drive the MEMS pressure sensor 12 with the drive current Iout3. Accordingly, the sensor drive circuit 100-3 according to the present embodiment can cancel a given second order component of the temperature characteristic of the span voltage for the MEMS pressure sensor 12, in analog signal processing. As a result, the output voltage Vout of the MEMS pressure sensor 12 is set by the formula of Vout $\fallingdotseq$ $\frac{1}{2} \times \pi 44 \times \sigma \times R \times$Iout. In this case, the product calculated by π44×R indicates a temperature characteristic opposite to that of the drive current Iout, and thus the temperature characteristic of the output voltage Vout becomes flat. Accordingly, in the sensor drive circuit 100-3 according to the present embodiment, with a relatively simple circuit configuration, output errors of the MEMS pressure sensor 12 due to a given temperature can be corrected with high accuracy.

Fourth Embodiment

Figure 5:
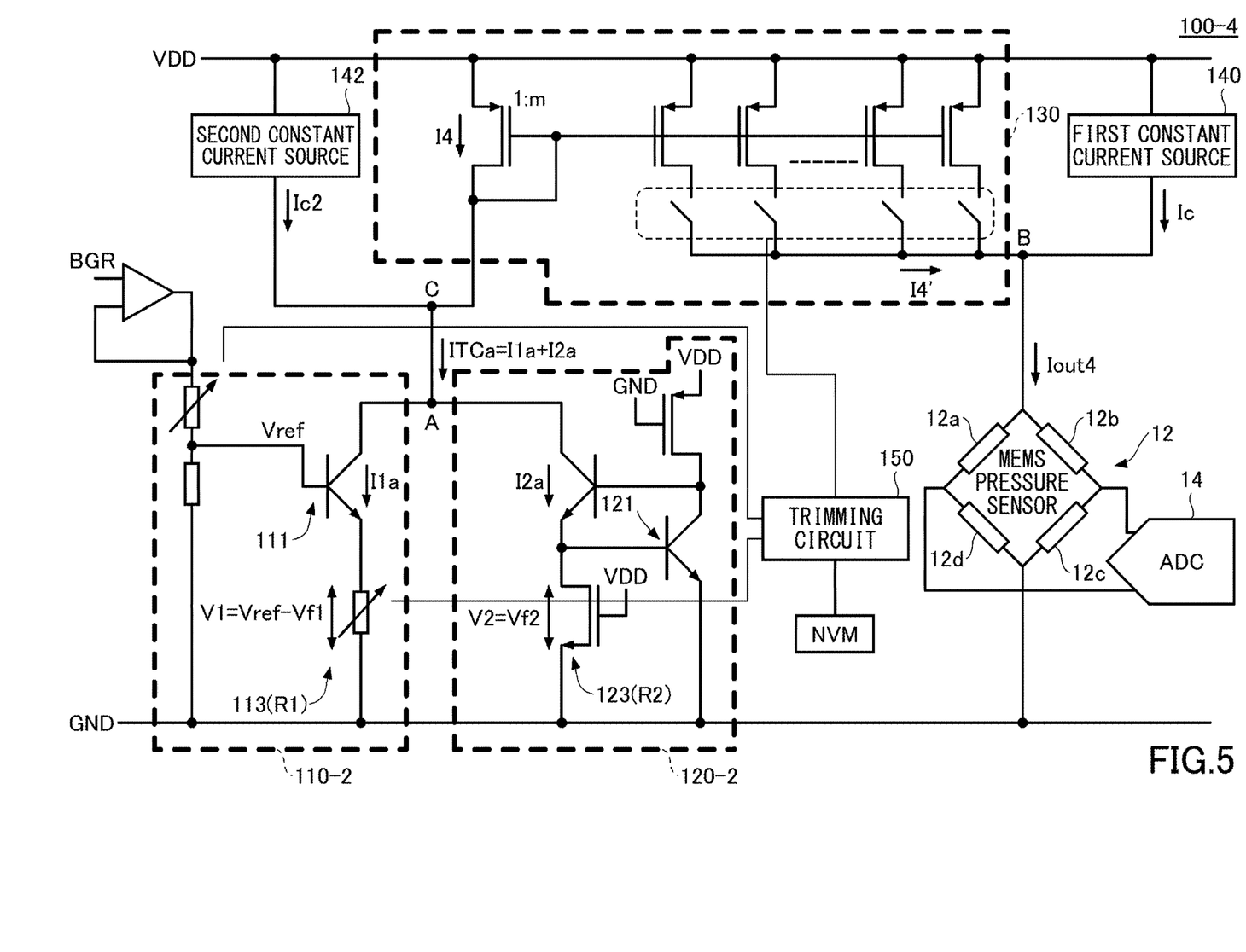
FIG. 5 is a diagram illustrating an example of the circuit configuration of the sensor drive circuit according to a fourth embodiment.

Hereafter, a fourth embodiment will be described with reference to FIG. 5. FIG. 5 is a diagram illustrating an example of the circuit configuration of a sensor drive circuit 100-4 according to the fourth embodiment. In the following description, the portion of the sensor drive circuit 100-4 that differs from the sensor drive circuit 100 according to the first embodiment will be described.

In the sensor drive circuit 100-4 illustrated in FIG. 5, a connection node D is not provided. Instead of the connection node D, in the sensor drive circuit 100-4, a connection node C is provided between the connection node A and the current amplifier 130, and the second constant current source 142 is coupled to the connection node C. In other words, in the sensor drive circuit 100-3 illustrated in FIG. 4, the second constant current source 142 is provided at a rear stage of the current amplifier 130. In contrast, in the sensor drive circuit 100-4 illustrated in FIG. 5, the second constant current source 142 is provided at a front stage of the current amplifier 130. In this regard, the sensor drive circuit 100-4 differs from the sensor drive circuit 100-3. In the present embodiment, a current I4 flowing toward the connection node C is set through subtraction of the second constant current Ic2, which is generated by the second constant current source 142, from the current ITCa flowing into the connection node A, where the temperature characteristic of the set current I4 has a negative second order coefficient.

In the sensor drive circuit 100-4 illustrated in FIG. 5, the current amplifier 130 amplifies the current I4 flowing toward the connection node C by a gain of m to thereby generate an amplified current I4'.

In the sensor drive circuit 100-4, the drive current Iout4 for driving the MEMS pressure sensor 12 is set by adding the first constant current Ic, which is generated by the first constant current source 140, to the current I4' generated by the current amplifier 130.

In such a configuration, in the sensor drive circuit 100-4 according to the present embodiment, before the current amplifier 130 performs an amplifying process, the second constant current Ic2, which is generated by the second constant current source 142, is subtracted from the third current ITCa having a given temperature characteristic of which the second order coefficient is positive. Thus, the current I4 having a given temperature characteristic of which the second order coefficient is negative is set. Further, in the sensor drive circuit 100-4 according to the present embodiment, the current amplifier 130 amplifies the current I4 by a gain of m to thereby generate an amplified current I4', and then the first constant current Ic is added to the current I4'. Thus, the drive current Iout4 having a reverse temperature characteristic (including a second order characteristic) with respect to the temperature characteristic of a given span voltage of the MEMS pressure sensor 12 is set. In such a manner, the sensor drive circuit 100-4 can drive the MEMS pressure sensor 12 with the drive current Iout4. Accordingly, the sensor drive circuit 100-4 according to the present embodiment can cancel a given second order component of the temperature characteristic of the span voltage for the MEMS pressure sensor 12, in analog signal processing. As a result, the output voltage Vout of the MEMS pressure sensor 12 is set by the formula of Vout≈½×π44×σ×R×Iout. In this case, the product calculated by π44×R indicates a temperature characteristic opposite to that of the drive current Iout, and thus the temperature characteristic of the output voltage Vout becomes flat. Accordingly, in the sensor drive circuit 100-4 according to the present embodiment, with a relatively simple circuit configuration, output errors of the MEMS pressure sensor 12 due to a given temperature can be corrected with high accuracy.

Although one or more embodiments of the present disclosure have been described in detail above, the present disclosure is not limited to the embodiments described above. Various modifications or changes can be made within departing from a scope defined in the present disclosure.

For example, in the one or more embodiments, the polysilicon resistor and NMOSFET are respectively used as resistance R1 and resistance R2. Such components can be implemented on a single chip in a typical analog CMOS process, thereby resulting in reduced manufacturing costs and reduced failure rates due to the decreased number of components. Note, however, that the manner of the resistance R1 and resistance R2 is not limited to the example described above, and another component (e.g., a wiring resistor, a thermistor, or the like) may be used as each of the resistance R1 and the resistance R2.

The circuit configuration of a given sensor drive circuit is not limited to the circuit configuration described in the one or more embodiments. Any circuit configuration may be adopted as the circuit configuration of a given sensor drive circuit, as long as a drive current having a reverse temperature characteristic with respect to the temperature characteristic of a given span voltage for a sensor can be generated.

What is claimed is:

1. A sensor drive circuit for driving a sensor with a current,
wherein a temperature characteristic of sensor sensitivity has a negative first order coefficient and a positive second order coefficient, the sensor drive circuit comprising:
at least one circuit configured to generate a drive current for the sensor, the drive current having a reverse temperature characteristic with respect to a temperature characteristic of an output voltage of the sensor,
wherein the at least one circuit includes
a first current source configured to generate a first current having a temperature characteristic of which a first order coefficient is positive,
a second current source configured to generate a second current having a temperature characteristic of which a first coefficient is negative, and
a first current calculator configured to add the first current and the second current to generate a third current.

2. The sensor drive circuit according to claim 1, wherein the temperature characteristic of the first current generated by the first current source has a negative second order coefficient and the temperature characteristic of the second current generated by the second current source has a negative second order coefficient, and
wherein the at least one circuit includes
a current amplifier configured to amplify the third current to generate the amplified third current,
a constant current source configured to generate a temperature-corrected constant current, and a second current calculator configured to add the constant current to the amplified third current to generate the drive current for the sensor.

3. The sensor drive circuit according to claim 2, wherein the drive current causes the first order coefficient and the second order coefficient of the temperature characteristic of the output voltage of the sensor to be canceled.

4. The sensor drive circuit according to claim 2, further comprising a trimming circuit configured to trim the first current.

5. The sensor drive circuit according to claim 2, further comprising a trimming circuit configured to trim the amplified third current.

6. The sensor drive circuit according to claim 2,
wherein the first current source includes a first transistor with a first terminal to which a reference voltage is applied, the reference voltage having a first threshold voltage, the reference voltage not being dependent on a temperature, and the first current source being configured to generate the first current based on a difference between the reference voltage and the first threshold voltage, and
wherein the second current source includes a second transistor having a second threshold voltage, the second current source being configured to generate the second current based on the second threshold voltage.

7. The sensor drive circuit according to claim 1, wherein the temperature characteristic of the first current generated by the first current source has a positive second order coefficient and the temperature characteristic of the second current generated by the second current source has a positive second order coefficient, and
wherein the at least one circuit includes
a current amplifier configured to amplify a third current to generate the amplified third current,
a first constant current source configured to generate a first constant current that is temperature-corrected,
a second current calculator configured to subtract the amplified third current from the temperature-corrected first constant current,
a second constant current source configured to generate a second constant current that is temperature-corrected, and
a third current calculator configured to add the second constant to the amplified third current subtracted from the temperature-corrected first constant current to generate the drive current for the sensor.

* * * * *